(12) United States Patent
Wang et al.

(10) Patent No.: US 9,733,743 B2
(45) Date of Patent: Aug. 15, 2017

(54) IN-CELL TOUCH SCREEN AND DISPLAY DEVICE

(71) Applicants:BOE Technology Group Co., Ltd., Beijing (CN); Beijing BOE Optoelectronics Technology Co., Ltd., Beijing (CN)

(72) Inventors: Haisheng Wang, Beijing (CN); Xue Dong, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 14/888,145

(22) PCT Filed: Feb. 13, 2015

(86) PCT No.: PCT/CN2015/073009
§ 371 (c)(1),
(2) Date: Oct. 30, 2015

(87) PCT Pub. No.: WO2016/070528
PCT Pub. Date: May 12, 2016

(65) Prior Publication Data
US 2016/0328059 A1    Nov. 10, 2016

(30) Foreign Application Priority Data

Nov. 6, 2014   (CN) .......................... 2014 1 0638383

(51) Int. Cl.
*G06F 3/045* (2006.01)
*G06F 3/041* (2006.01)
(Continued)

(52) U.S. Cl.
CPC ............ *G06F 3/0412* (2013.01); *G06F 3/044* (2013.01); *G06F 3/047* (2013.01); *G06F 3/0416* (2013.01); *G06F 2203/04111* (2013.01)

(58) Field of Classification Search
CPC .......... G06F 3/041; G06F 3/044; G06F 3/047; G06F 3/0412; G06F 2203/04111; G06F 3/0416
(Continued)

(56) References Cited

U.S. PATENT DOCUMENTS

2010/0002827 A1    1/2010  Shih et al.
2010/0194697 A1*   8/2010  Hotelling .............. G06F 3/0412
                                                    345/173
(Continued)

FOREIGN PATENT DOCUMENTS

CN    102460587 A    5/2012
CN    102983132 A    3/2013
(Continued)

OTHER PUBLICATIONS

Sep. 2, 2015—(WO)—International Search Report and Written Opinion Appn PCT/CN2015/080550 with English Tran.
(Continued)

*Primary Examiner* — Kent Chang
*Assistant Examiner* — Mark Edwards
(74) *Attorney, Agent, or Firm* — Banner & Witcoff, Ltd.

(57) ABSTRACT

In an in-cell touch panel and a display device, the common electrode layer in the array substrate is partitioned into a plurality of sub-electrodes arranged in an array, spaced sub-electrodes in each column of sub-electrodes serve as touch driving sub-electrodes (a) constituting a touch driving electrode and sub-electrodes other than them serve as common sub-electrodes (b). During line-by-line scanning of gate lines covered by a row of sub-electrodes, the row of sub-
(Continued)

electrodes are applied with common electrode signals, touch driving sub-electrodes in other rows of sub-electrodes are applied with touch driving signals, and common sub-electrodes in other rows of sub-electrodes are applied with common electrode signals. The in-cell touch panel can avoid various display and touch problems resulted from deficiency of time caused by time-division driving.

17 Claims, 5 Drawing Sheets

(51) Int. Cl.
  *G06F 3/044* (2006.01)
  *G06F 3/047* (2006.01)
(58) Field of Classification Search
  USPC .......................................................... 345/174
  See application file for complete search history.

(56) References Cited

U.S. PATENT DOCUMENTS

| | | | |
|---|---|---|---|
| 2013/0215075 A1* | 8/2013 | Lee | G06F 3/044 345/174 |
| 2014/0049508 A1* | 2/2014 | Kim | G06F 3/044 345/174 |
| 2014/0152935 A1 | 6/2014 | Heo et al. | |
| 2014/0306916 A1* | 10/2014 | Wang | G06F 3/041 345/173 |

FOREIGN PATENT DOCUMENTS

| | | |
|---|---|---|
| CN | 103593083 A | 2/2014 |
| CN | 103838430 A | 6/2014 |
| CN | 103838431 A | 6/2014 |
| CN | 104021769 A | 9/2014 |
| CN | 104183225 A | 12/2014 |
| CN | 104317467 A | 1/2015 |
| CN | 204129705 U | 1/2015 |
| CN | 204166510 U | 2/2015 |
| CN | 104485085 A | 4/2015 |
| KR | 20140087483 A | 7/2014 |

OTHER PUBLICATIONS

May 10, 2016—(CN)—First Office Action Appn 201510001826.4 with English Tran.
Jul. 29, 2015—International Search Report Appn PCT/CN2015/073009 with Eng Tran of Written Opinion.
Nov. 30, 2016—(CN) First Office Action Appn 201410638383.5 with English Tran.
Apr. 26, 2017—(CN) Second Office Action Appn 201410638383.5 with English Tran.

* cited by examiner

IN-CELL TOUCH SCREEN AND DISPLAY DEVICE

The application is a U.S. National Phase Entry of International Application No. PCT/CN2015/073009 filed on Feb. 13, 2015, designating the United States of America and claiming priority to Chinese Patent Application No. 201410638383.5 filed on Nov. 6, 2014. The present application claims priority to and the benefit of the above-identified applications and the above-identified applications are incorporated by reference herein in their entirety.

TECHNICAL FIELD

Embodiments of the present invention relate to an in-cell touch screen and a display device.

BACKGROUND

Generally, in-cell touch panels utilize mutual capacitance principle to detect touch position of a finger. A pattern of touch electrodes is generally embedded within the touch panel. In order to avoid mutual interference between touch signals applied by touch electrodes and normal display signals in the touch screen, the touch function and the display function are typically driven in a time-division manner. As illustrated in FIG. 1, a frame period (Vsync) is divided into a touch interval (Touch) and a display interval (Display). Data signals and gate lines Gn-2, Gn-1, Gn, G3, G2 and G1 only work in the display interval, and touch signals only work in the touch interval. Thus, durations assigned for the touch interval and the display interval in each frame are relatively short, and deficiency of time caused by the time-division driving may result in various display and touch problems.

SUMMARY

Embodiments of the present invention provide an in-cell touch panel and a display device to address the display and touch problems resulted from deficiency of time caused by driving the touch and display functions in a time-division manner for in-cell touch panels.

At least one embodiment of the present invention provides an in-cell touch panel including: an array substrate including gate lines and a common electrode layer, and an opposing substrate disposed oppositely to the array substrate, the common electrode layer of the array substrate including a plurality of sub-electrodes arranged in an array; spaced sub-electrodes in each column of the sub-electrodes serve as touch driving sub-electrodes constituting a touch driving electrode and sub-electrodes other than touch driving sub-electrodes serve as common sub-electrodes; upon line-by-line scanning of the gate lines covered by each row of sub-electrodes, sub-electrodes in the row are used to apply common electrode signals, touch driving sub-electrodes in rows other than the row of sub-electrodes are used to apply touch driving signals, and common sub-electrodes in rows other than the row of sub-electrodes are used to apply common electrode signals.

For example, the opposing substrate comprises a plurality of touch sensing electrodes disposed to intersect the touch driving electrodes, and orthogonal projections of the touch sensing electrodes on the array substrate are located in an area where the common sub-electrodes are located.

For example, in a non-display area the array substrate is provided with: touch signal lines in one-to-one correspondence with the touch driving electrodes, display control lines and touch control lines in one-to-one correspondence with sub-electrode rows comprising touch driving sub-electrodes, and common electrode signal lines.

For example, in each row of sub-electrodes, touch driving sub-electrodes are connected with touch signal lines corresponding to touch driving electrodes, to which they belong, via touch switching devices, and control ends of the touch switching devices are connected with a touch control line corresponding to the row of sub-electrodes; the touch switching devices are configured to conduct between touch signal lines and touch driving sub-electrodes when the gate lines covered by rows of sub-electrodes other than the row of sub-electrodes are scanned line by line; in each row of sub-electrodes, the touch driving sub-electrodes are connected with the common electrode signal line via display switching devices, and control ends of the display switching devices are connected with display control line corresponding to the row of sub-electrodes; the display switching devices are configured to conduct between the common electrode signal lines and the touch driving sub-electrodes when the gate lines covered by the row of sub-electrodes are scanned line by line.

For example, each of the touch switching devices comprises: a first switching transistor with a gate electrode connected with one of the touch control lines, a drain electrode connected with one of the touch driving sub-electrodes, and a source electrode connected with one of the touch signal line.

For example, the first switching transistor and the second switching transistor are both N-type transistors or P-type transistors and the display control line and touch control line corresponding to a same row of sub-electrodes are configured to apply control signals with opposite polarity at the same time; or the first switching transistor and the second switching transistor are an N-type transistor and a P-type transistor respectively and the display control line and touch control line corresponding to a same row of sub-electrodes are configured to apply control signals with a same polarity at the same time.

For example, a display control line corresponding to a row of sub-electrodes is connected with a gate line covered by the row of sub-electrodes via a turning-on switching device, and is connected with a last-scanned gate line covered by the row of sub-electrodes via a turning-off switching device, and a control end of the turning-off switching device is connected with the touch control line corresponding to the row of sub-electrodes; and the turning-on switching device and the turning-off switching device are configured to let the display control line have control signals with opposite polarities when the gate line covered by the row of sub-electrodes is scanned and when the scanning is completed.

For example, the turning-on switching device is a third switching transistor with a gate electrode and a source electrode connected with a corresponding gate line, and a drain electrode connected with the display control line; and the turning-off switching device is a fourth switching transistor with a gate electrode connected with the touch control line, a source electrode connected with a corresponding gate line, and a drain electrode connected with a display control line.

For example, in the plurality of sub-electrodes arranged in an array resulted from partition of the common electrode layer, and touch driving sub-electrodes and common sub-electrodes are arranged alternatively in both row and column directions of a matrix.

For example, in the plurality of sub-electrodes arranged in an array resulted from partition of the common electrode layer, touch driving sub-electrodes and common sub-electrodes are arranged in entire row in a matrix.

An embodiment of the present invention provides a display device including any of the above-mentioned in-cell touch panel provided in any one of the embodiments of the present invention.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

FIG. 4b is a timing diagram for operation in FIG. 4a.

REFERENCE NUMERALS

110—gate line; 120—common electrode layer; 100—array substrate; 200—opposing substrate; 121—touch driving electrode; 210—touch sensing electrode; a—touch driving sub-electrode; b—common sub-electrode.

DETAILED DESCRIPTION OF EMBODIMENTS

In order to understand the above-mentioned objects, features and advantages of the present invention more clearly, specific implementations of the in-cell touch panel and display device provided in embodiments of the present invention will be described in detail below with reference to accompanying drawings. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. Terms such as "first", "second" and the like used in the present disclosure do not indicate any sequence, quantity or significance but only for distinguishing different constituent parts. Thicknesses and shapes of layers in the accompanying drawings do not reflect real scale, and only serve to illustrate contents of the embodiments of the present invention.

Figure 1:
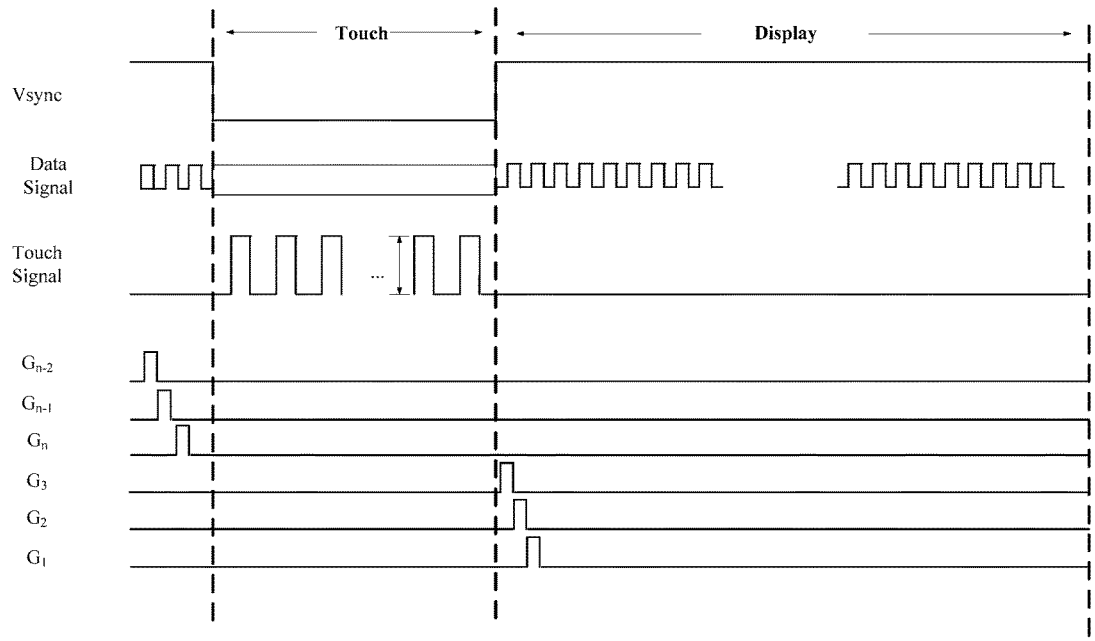
FIG. 1 is a timing diagram for an in-cell touch panel.
Figure 2:
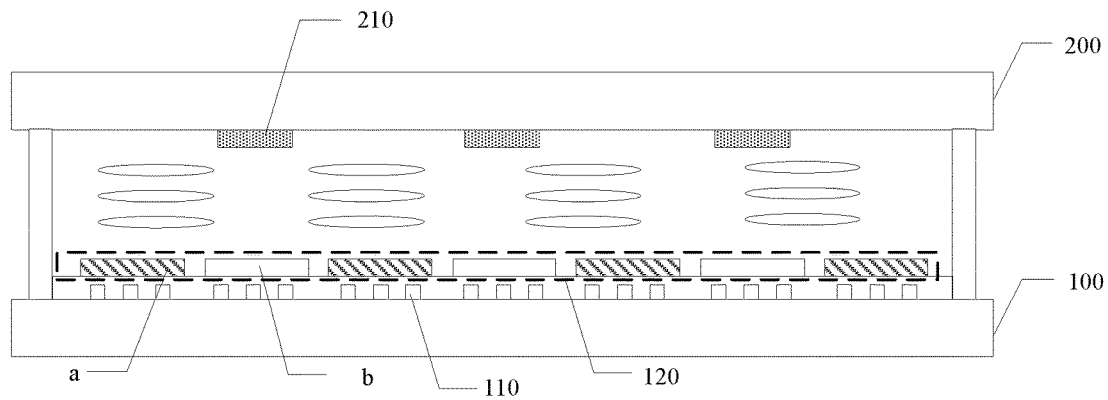
FIG. 2 is a longitudinal sectional diagram of an in-cell touch panel provided in an embodiment of the present invention.

FIG. 2 is a longitudinal sectional diagram of an in-cell touch panel provided in an embodiment of the present invention. An embodiment of the present invention provides an in-cell touch panel as illustrated in FIG. 2, comprising: an array substrate 100 comprising gate lines 110 and a common electrode layer 120, and an opposing substrate 200 disposed oppositely to the array substrate 100. For example, the common electrode layer 120 is disposed over gate lines 110. For example, the opposing substrate 200 is a color filter substrate including color filter units corresponding to sub-pixels units on the array substrate 100 and a black matrix and so on.

Figure 3A:
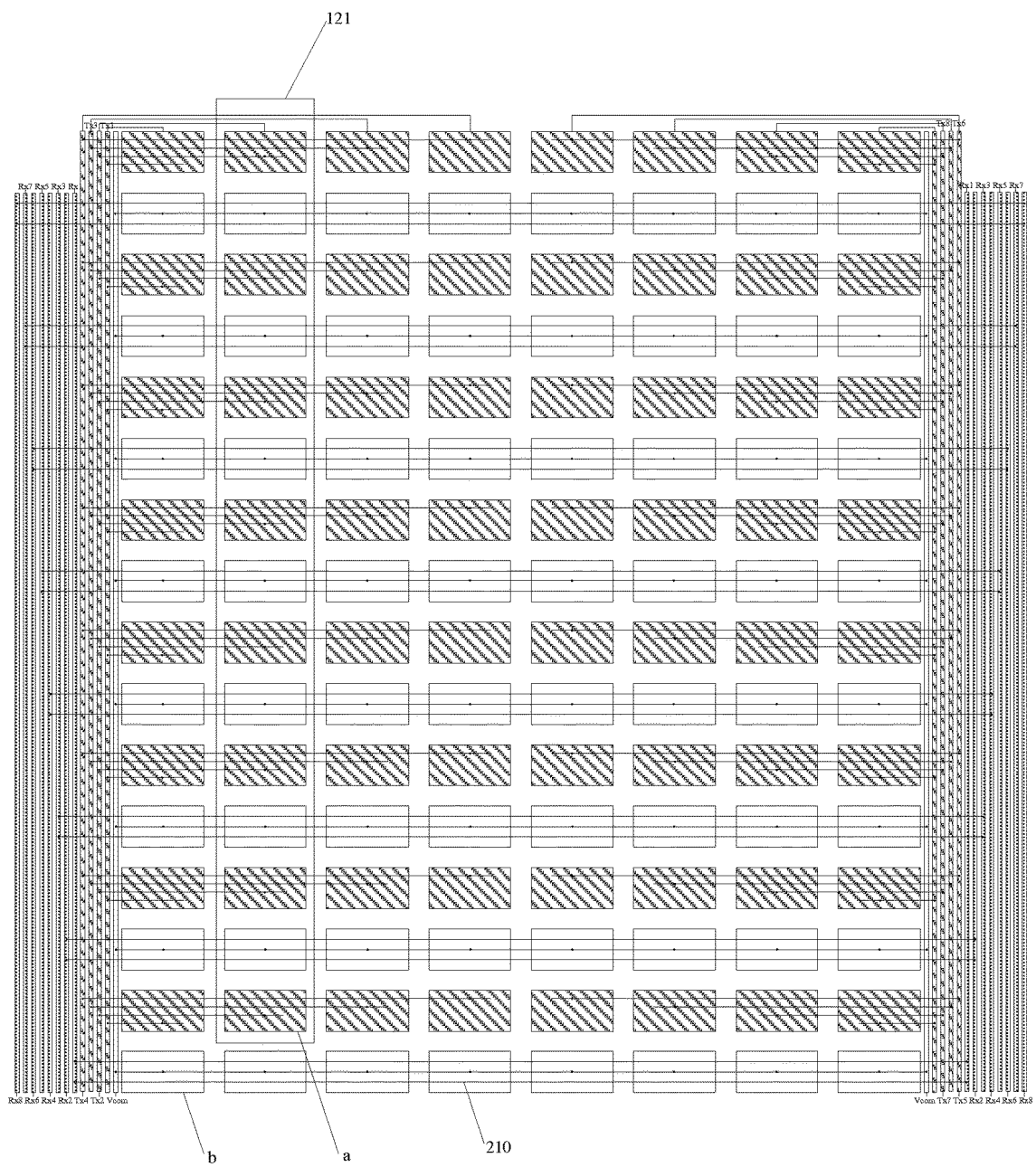
FIGS. 3a and 3b are top views of an in-cell touch panel provided in an embodiment of the present invention respectively.
Figure 3B:
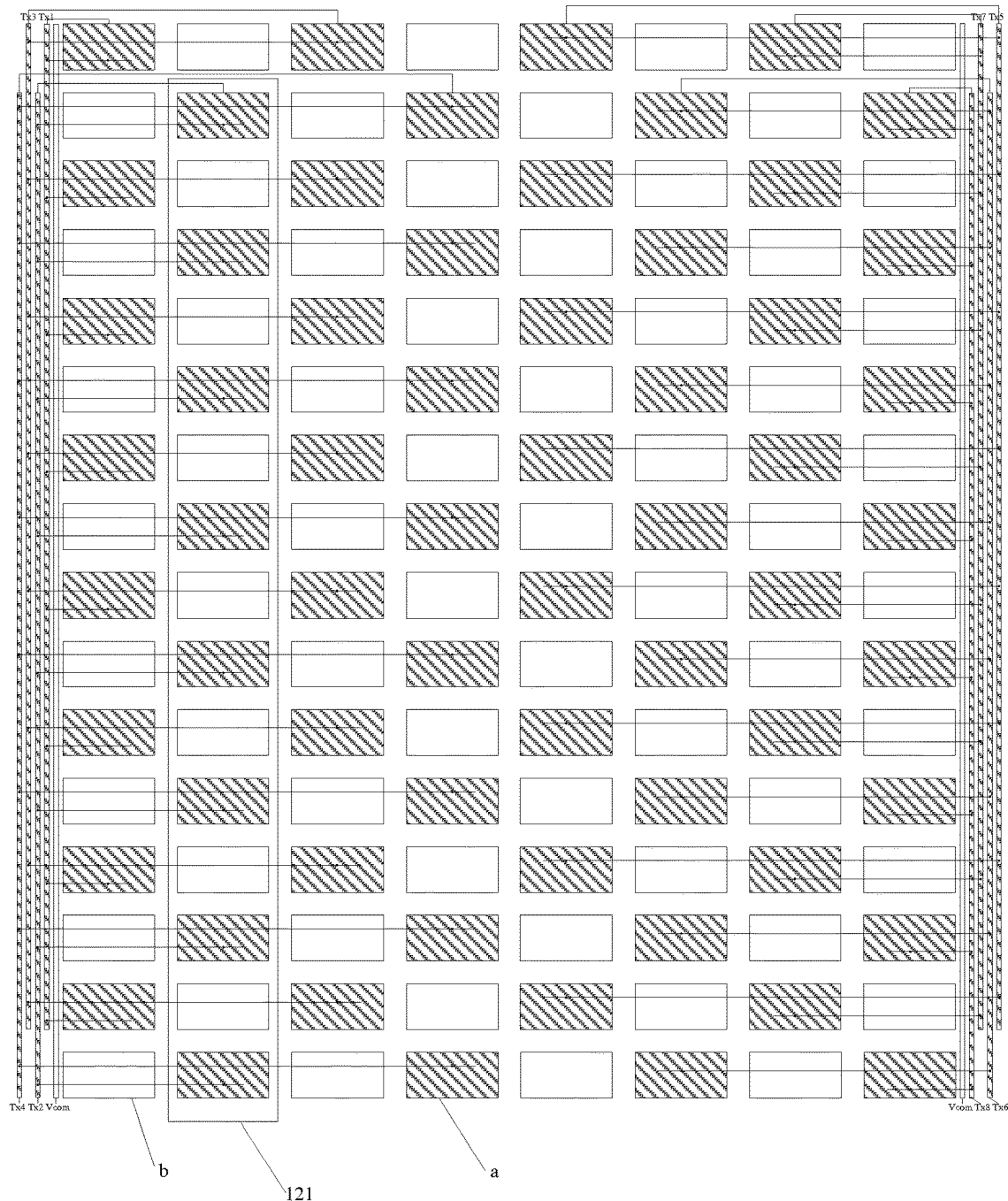

As illustrated in FIG. 3a and FIG. 3b, the common electrode layer 120 of the array substrate 100 includes a plurality of sub-electrodes arranged in an array. In each column of sub-electrodes, sub-electrodes that are provided spaced from each other serve as touch driving sub-electrodes a, and these sub-electrodes constitute a touch driving electrode 121 (as illustrated with shadowed blocks in FIGS. 3a and 3b), and sub-electrodes other than touch driving sub-electrodes a serve as common sub-electrodes b.

The opposing substrate 200 has a plurality of touch sensing electrodes 210 disposed to intersect touch driving electrodes 121. Orthogonal projections of the touch sensing electrodes 210 on the array substrate 100 are located in the area where common sub-electrodes b are located. For example, as illustrated in FIG. 3a, all the touch driving electrodes 121 disposed on the array substrate 100 extend in the longitudinal direction, while all the touch sensing electrodes 210 disposed on the opposing substrate 200 extend in the transverse direction. Arrangement of the touch sensing electrodes in this way can provide mutual capacitance of appropriate range between the touch sensing electrodes and the touch driving electrodes while avoid large mutual capacitance between them. This is in favor of detection of touch position comparatively.

Upon line-by-line scanning the gate lines that are covered by (corresponding to) each row of sub-electrodes, sub-electrodes in the respective row are employed to apply common electrode signals (Vcom), the touch driving sub-electrodes in the rows other than the present row of sub-electrodes are employed to apply touch driving signals (Touch), and common sub-electrodes in the rows other than the present row of sub-electrodes are employed to apply common electrode signals (Vcom). That is, while one row of sub-electrodes operates for conducting displaying, the other rows of touch driving sub-electrodes operate for conducting touch driving.

By adopting the above-mentioned driving manner for the in-cell touch panel provided in the embodiment of the present invention, it is possible to realize a display operation and a touch operation that are conducted simultaneously, ensuring that display and touch problems resulted from deficiency of time due to time-division driving will not occur in the case of high resolution display.

For example, in the above-mentioned in-cell touch panel provided in the embodiment of the present invention, the common electrode layer of the array substrate is partitioned into a plurality of sub-electrodes arranged in an array which may be divided into touch driving sub-electrodes and common sub-electrodes in the following two methods.

As the first method, as illustrated in FIG. 3a, touch driving sub-electrodes a and common sub-electrodes b are both aligned in whole rows, that is, one row of touch driving sub-electrodes a and one row of common sub-electrodes b are arranged alternatively. FIG. 3a shows eight (8) touch driving electrodes Tx1, . . . Tx8, each of which consists of eight (8) touch driving sub-electrodes a, while eight (8) electrodes Rx1, . . . Rx8 are also provided for touch sensing and disposed to intersect the touch driving electrodes 121.

As the second method, as illustrated in FIG. 3b, touch driving sub-electrodes a and common sub-electrodes b are arranged alternatively in both row direction and column direction of the matrix. FIG. 3b shows eight (8) touch driving electrodes Tx1, . . . Tx8, each of which consists of eight (8) touch driving sub-electrodes a respectively.

The array substrate in the first method will be described below to explain in detail how the above-mentioned in-cell touch panel provided in the embodiment of the present invention simultaneously implement the display and touch driving operations.

Figure 4A:
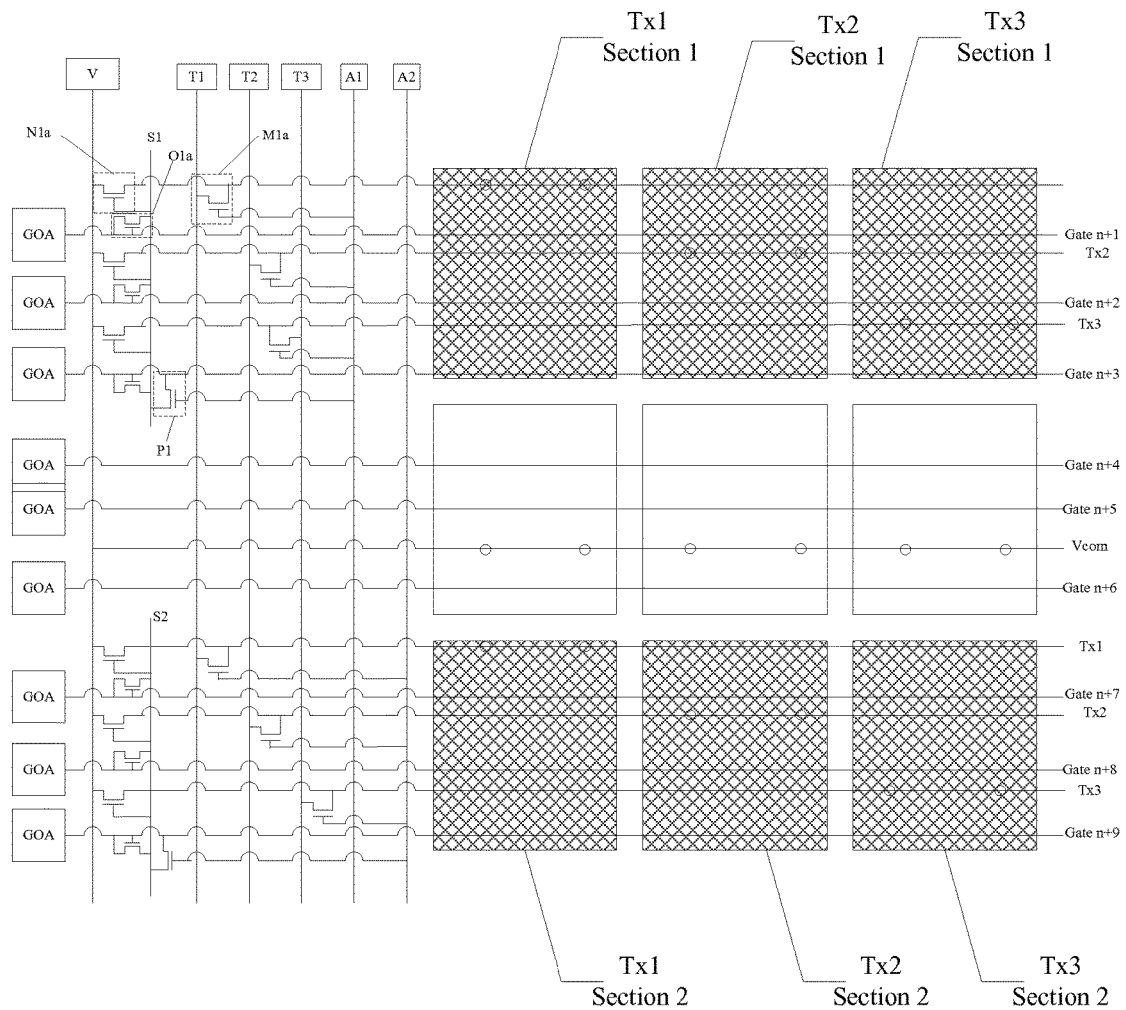
FIG. 4a is a schematic diagram of an array substrate in the in-cell touch panel provided in an embodiment of the present invention.

Considering an array substrate with a common electrode layer containing 3*3 sub-electrodes as an example, as illustrated in FIG. 4a, both the first and third rows of sub-electrodes serve as touch driving sub-electrodes, the second row of sub-electrodes serve as common sub-electrodes, the touch driving sub-electrodes are divided into 3 touch driving electrodes Tx1, Tx2 and Tx3 extending in longitudinal direction, and each touch driving electrode consists of two subsections, i.e., subsection 1 and subsection 2 of the touch driving sub-electrode, respectively.

Generally, the touch resolution of a touch panel is typically on the order of millimeters. Therefore, upon specific implementation, it is possible to select the densities and occupied areas of touch driving sub-electrodes according to the required touch resolution. Generally, touch driving sub-electrodes are designed as square electrodes of 5 mm*5 mm or so. While the display resolution of a display screen is generally on the order of microns. Therefore, a single touch driving sub-electrode generally corresponds to a plurality of pixel units in the display screen. That is, a touch driving sub-electrode will cover a plurality of gate lines. In FIG. 4a, one row of sub-electrodes covering three (3) gate lines will be described as an example, in which the first row of sub-electrodes cover gate lines Gate n+1, Gate n+2 and Gate n+3 (namely the (n+1)th to (n+3)th gate lines), the second row of sub-electrodes cover gate lines Gate n+4, Gate n+5 and Gate n+6 (namely the (n+4)th to (n+6)th gate lines), and the third row of sub-electrodes cover gate lines Gate n+7, Gate n+8 and Gate n+9 (namely the (n+7)th to (n+9)th gate lines).

Figure 4B:
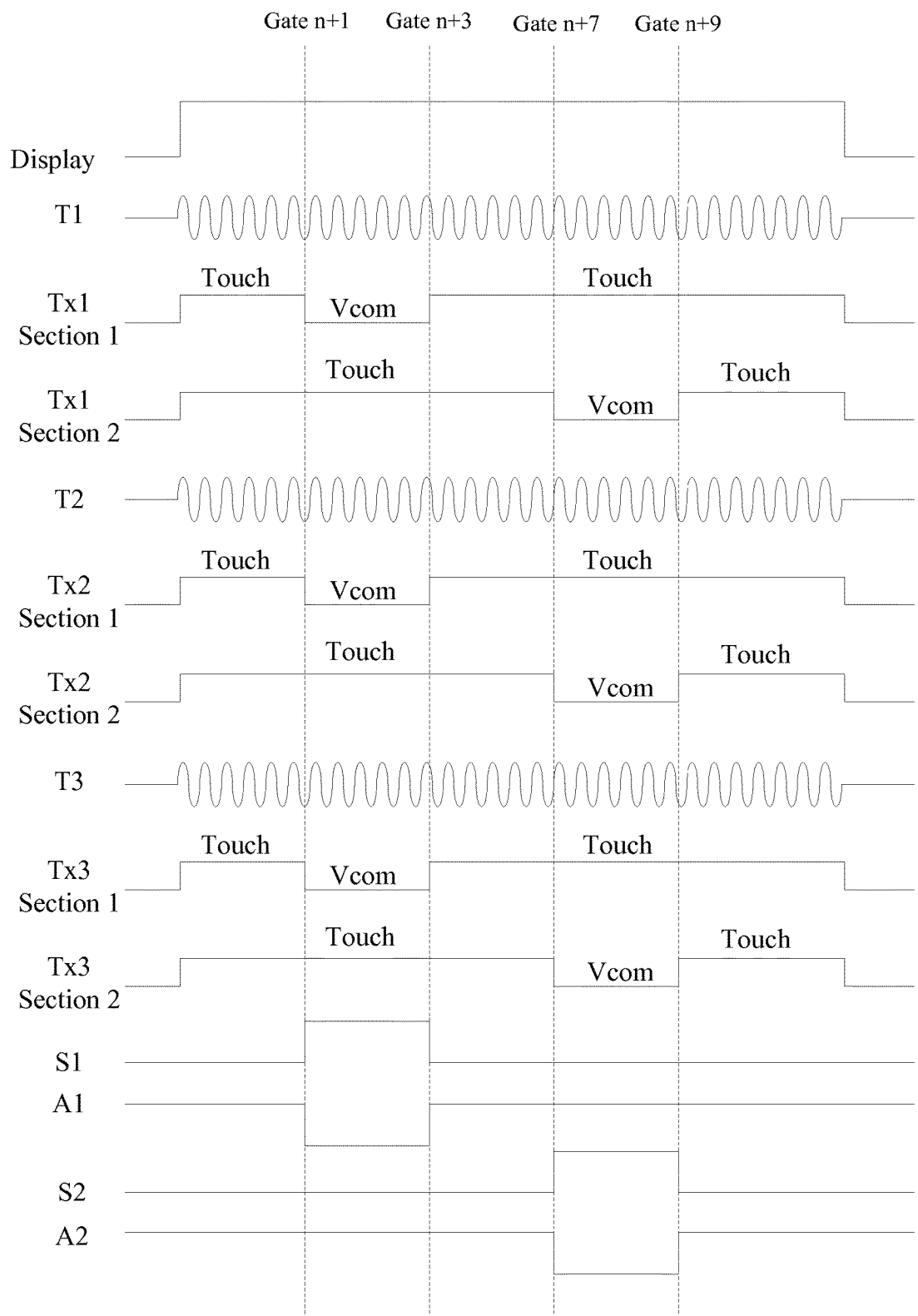

In the display interval (Display) of a frame, gate driving circuits (GOAs) connected with the gate lines will scan gate lines line by line. As illustrated in FIG. 4b, while scanning from the gate line Gate n+1 to the gate line Gate n+3, the Tx1 subsection 1, Tx2 subsection 1, and Tx3 subsection 1 of the first row of sub-electrodes serve as common sub-electrodes to apply common electrode signals (Vcom), and Tx1 subsection 2, Tx2 subsection 2, and Tx3 subsection 2 of the touch driving sub-electrodes in the third row of sub-electrodes conduct touch scanning to apply touch driving signals (Touch). Similarly, while scanning from the gate line Gate n+4 to the gate line Gate n+6, the second row of sub-electrodes serve as common sub-electrodes to apply common electrode signals (Vcom), and Tx1 subsection 1, Tx2 subsection 1, and Tx3 subsection 1 of the touch driving sub-electrodes in the first row of sub-electrodes, and Tx1 subsection 2, Tx2 subsection 2, and Tx3 subsection 2 of the touch driving sub-electrodes in the third row of sub-electrodes conduct touch scanning to apply touch driving signals (Touch). While scanning from the gate line Gate n+7 to the gate line Gate n+9, TX1 subsection 2, Tx2 subsection 2, and Tx3 subsection 2 of the touch driving sub-electrodes in the third row of sub-electrodes serve as common sub-electrodes to apply common electrode signals (Vcom), and Tx1 subsection 1, Tx2 subsection 1, and Tx3 subsection 1 of the touch driving sub-electrodes in the first row of sub-electrodes conduct touch scanning to apply touch driving signals (Touch). This kind of operation ensures that, in the period of a frame, three rows of sub-electrodes in the entire panel are scanned once according to display driving, and each row of sub-electrodes are scanned twice respectively according to touch driving. In this way, it is possible to realize that the scanning frequency of touch driving is 2 times more than the scanning frequency of display driving. For example, 60 Hz scanning is conducted for display driving, and 120 Hz scanning may be conducted for touch driving, which can satisfy normal touch driving requirement (80 Hz-120 Hz).

The array substrate having a common electrode layer containing 3*3 sub-electrodes as illustrated in FIG. 4a will be described as an example to explain how the above-mentioned in-cell touch panel provided in the embodiment of the present invention control the same touch driving sub-electrode to apply different electrical signals in different time intervals.

As illustrated in FIG. 4a, the array substrate 100 is generally provided in the non-display area with touch signal lines T1, T2 and T3 in one-to-one correspondence with the touch driving electrodes Tx1, Tx2 and Tx3, display control lines S1, S2 and touch control lines A1, A2 in one-to-one correspondence with the sub-electrode rows having touch driving sub-electrodes (namely the first row and the third row), and a common electrode signal line V. In order to facilitate applying corresponding electrical signals, these lines generally extend in longitudinal direction in the non-display area of the array substrate.

In the each row of sub-electrodes, touch driving sub-electrodes are connected with touch signal lines corresponding to the touch driving electrodes, to which they belong, via touch switching devices, and control ends of the touch switching devices are connected with a touch control line corresponding to the row of sub-electrodes. For example, the subsection 1 of touch driving sub-electrode Tx1 in the first row is connected with the touch signal line T1 via a touch switching device M1a, and the control end of the touch switching device M1a is connected with the line A1. The touch switching device M1a is configured to conduct between the touch signal line T1 and the subsection 1 of touch driving sub-electrode Tx1 when the gate lines (Gate n+4 to Gate n+9) covered by rows of sub-electrodes (the second and third rows) other than the present row of sub-electrodes (first row) are scanned line by line, such that the subsection 1 of the touch driving sub-electrode Tx1 is applied with touch scanning signals.

In each row of sub-electrodes, each touch driving sub-electrode is connected with the common electrode signal line via a display switching device, and the control end of the display switching device is connected with the display control line corresponding to the row of sub-electrodes. For example, the subsection 1 of the touch driving sub-electrode Tx1 in the first row is connected with the common electrode signal line V via a display switching device N1a, and the control end of the display switching device N1a is connected with the display control line S1. The display switching device N1a is configured to conduct between the common electrode signal line V and the subsection 1 of touch driving sub-electrode Tx1 when the gate lines Gate n+1 to Gate n+3 covered by the row of sub-electrodes (the first row) are scanned line by line such that the subsection 1 of the touch driving sub-electrode Tx1 is applied with common electrode signals, and thereby can cooperate with pixel electrodes of sub-pixels in the respective row to implement the display operation.

The above describes only the subsection 1 of the touch driving sub-electrode Tx1 as an example, and the operation principle of other touch driving sub-electrodes is similar and will not be repeated in detail.

For example, as illustrated in FIG. 4a, the above-mentioned touch switching device M1a may include: a first switching transistor having a gate electrode connected with the touch control line A1, a drain electrode connected with the subsection 1 of the touch driving sub-electrode Tx1, and a source electrode connected with the touch signal line T1. The above-mentioned display switching device N1a may include: a second switching transistor having a gate electrode connected with the display control line S1, a drain electrode connected with the subsection 1 of the touch driving sub-electrode Tx1, and a source electrode connected with the common electrode signal line V.

For example, in the case where switching transistors are used as touch switching devices and display switching devices, electrical signals applied over the touch control lines and the display control lines serve as control signals for turning on and off the switching transistors respectively. Therefore, it is possible to set corresponding control signals according to the type of switching transistors. For example, if both the first and second switching transistors are N-type transistors or P-type transistors, the display control line and the touch control line corresponding to the same row of sub-electrodes are configured to apply control signals with opposite polarities at the same time, as illustrated by the control signals applied by the lines A1 and S1, A2 and S2 in FIG. 4b, so as to ensure that only one of the first and second switching transistors is turned on. If the first and second switching transistors are N-type transistor and P-type transistor respectively, the display control line and the touch control line corresponding to the same row of sub-electrodes are configured to apply control signals with the same polarity at the same time to ensure that one of the first and second switching transistors is selected to be turned on.

Furthermore, because there are many wires disposed in the non-display area of the array substrate, if each wire is provided with an input signal separately, a large space will be occupied. Therefore, in order to reduce the space occupied by the wires, for example, it is possible to control the signals applied over the display control lines S1 and S2 with the signals applied over other wires. As illustrated in FIG. 4a, a display control line corresponding to a row of sub-electrodes may be connected with the gate lines covered by the row of sub-electrodes via a turning-on switching device, and connected with the last-scanned gate line covered by the row of sub-electrodes via a turning-off switching device, and the control end of the turning-off switching device is connected with the touch control line corresponding to the row of sub-electrodes. For example, the display control line S1 corresponding to the first row of sub-electrodes is connected with gate lines Gate n+1 to Gate n+3 respectively through three turning-on switching devices O1a, and connected with the last-scanned gate line Gate n+3 covered by the row of sub-electrode via a turning-off switching device P1. The control end of the turning-off switching device P1 is connected with the touch control line A1 corresponding to the row of sub-electrodes. The turning-on switching device O1a and the turning-off switching device P1 are configured to let the display control line have control signals with opposite polarities when the gate lines covered by the row of sub-electrodes are scanned and when the scanning is completed. That is, when the gate lines Gate n+1 to Gate n+3 are scanned, the signal applied on the display control line S1 and the signal applied on gate lines are identical, e.g., a high level signal, and when scanning of the gate line Gate n+3 is completed, become a low level signal, that is, then the signal applied on the display control line S1 is pulled down to be a low level signal.

As illustrated in FIG. 4a, the above-mentioned turning-on switching device O1a is a third switching transistor having both a gate electrode and a source electrode connected with the corresponding gate line Gate n+1, and a drain electrode connected with the display control line S1. The above-mentioned turning-off switching device P1 is a fourth switching transistor having a gate electrode connected with the touch control line A1, a source electrode connected with the gate line Gate n+3, and a drain electrode connected with the display control line S1.

An embodiment of the present invention further provides a display device including any of the above-mentioned in-cell touch panels provided in any embodiment of the present invention, which may be any product or component with display function such as a cell phone, a watch, a slab computer, a TV set, a display, a notebook computer, a digital picture frame or a navigator. The above-mentioned embodiments of the in-cell touch panel may be referred to for implementations of the display device, and repeated description will not be conducted any more.

In the in-cell touch panel and display device provided in embodiments of the present invention, the common electrode layer connected in the entire surface of the array substrate is partitioned into a plurality of sub-electrodes arranged in an array, spaced sub-electrodes in each column of sub-electrodes serve as touch driving sub-electrodes that constitute a touch driving electrode, sub-electrodes other than touch driving sub-electrodes serve as common sub-electrodes; a plurality of touch sensing electrodes are provided on the opposing substrate and disposed to intersect touch driving electrodes, and projections of touch sensing electrodes on the array substrate are located within the area where common sub-electrodes are located. For example, the following driving method may be adopted, in which upon line-by-line scanning of the gate lines covered by each row of sub-electrodes, sub-electrodes in the row are used to apply common electrode signals, touch driving sub-electrodes in rows other than the present row of sub-electrodes are used to apply touch driving signals, and common sub-electrodes in rows other than the present row of sub-electrodes are used to apply common electrode signals. That is, when one row of sub-electrodes are operating for displaying, other rows of touch driving sub-electrodes are operating for touch driving. With the above-mentioned driving manner, it is possible to realize simultaneous display and touch operations and guarantee that various display and touch problems resulted from deficiency of time caused by time-division driving will not occur upon high resolution display.

It is understood that one skilled in the art can make various modifications and variations to the present invention without departing from the spirit and scope of the present invention. Thus, if these modifications and variations of the present invention fall within the scope of claims and their equivalents of the present invention, it is intended that the present invention contains these modifications and variations.

The present application claims priority of China Patent application No. 201410638383.5 filed on Nov. 6, 2014, the content of which is incorporated in its entirety as part of the present application by reference herein.

The invention claimed is:

1. An in-cell touch panel comprising: an array substrate comprising gate lines and a common electrode layer, and an opposing substrate disposed oppositely to the array substrate, wherein:

the common electrode layer of the array substrate comprises a plurality of sub-electrodes arranged in an array; spaced sub-electrodes in each column of the sub-electrodes serve as touch driving sub-electrodes constituting a touch driving electrode, and sub-electrodes other than the touch driving sub-electrodes serve as common sub-electrodes;

during line-by-line scanning of the gate lines covered by each row of sub-electrodes, sub-electrodes in the row are used to be applied with common electrode signals for conducting a displaying function, touch driving sub-electrodes in rows other than the row of sub-electrodes are used to be applied with touch driving signals for conducting a touch driving function, and common sub-electrodes in rows other than the row of sub-electrodes are used to be applied with common electrode signals;

in a non-display area the array substrate is provided with display control lines and touch control lines in one-to-one correspondence with sub-electrode rows comprising touch driving sub-electrodes;

each display control line corresponding to a corresponding row of sub-electrodes is connected with a gate line covered by the row of sub-electrodes via a turning-on switching device, and is connected with a last-scanned gate line covered by the row of sub-electrodes via a turning-off switching device, and a control end of the turning-off switching device is connected with a touch control line corresponding to the row of sub-electrodes; and the turning-on switching device and the turning-off switching device are configured to let the display control line have control signals with opposite polarities when the gate line covered by the row of sub-electrodes is scanned and when the scanning is completed.

2. The in-cell touch panel of claim 1, wherein, the opposing substrate comprises a plurality of touch sensing electrodes that are disposed to intersect the touch driving electrodes, and orthogonal projections of the touch sensing electrodes on the array substrate are located in an area where the common sub-electrodes are located.

3. The in-cell touch panel of claim 1, wherein, in the non-display area, the array substrate is also provided with: touch signal lines in a one-to-one correspondence with the touch driving electrodes, and common electrode signal lines.

4. The in-cell touch panel of claim 3, wherein, in each row of sub-electrodes, touch driving sub-electrodes are connected with touch signal lines corresponding to touch driving electrodes, to which they belong, via touch switching devices, and control ends of the touch switching devices are connected with a touch control line corresponding to the row of sub-electrodes; the touch switching devices are configured to conduct between touch signal lines and touch driving sub-electrodes when the gate lines covered by rows of sub-electrodes other than the row of sub-electrodes are scanned line by line; and in each row of sub-electrodes, the touch driving sub-electrodes are connected with the common electrode signal line via display switching devices, and control ends of the display switching devices are connected with display control line corresponding to the row of sub-electrodes; the display switching devices are configured to conduct between the common electrode signal lines and the touch driving sub-electrodes when the gate lines covered by the row of sub-electrodes are scanned line by line.

5. The in-cell touch panel of claim 4, wherein, each of the touch switching devices comprises: a first switching transistor with a gate electrode connected with one of the touch control lines, a drain electrode connected with one of the touch driving sub-electrodes, and a source electrode connected with one of the touch signal lines.

6. The in-cell touch panel of claim 5, wherein, each of the display switching devices comprises: a second switching transistor with a gate electrode connected with one of the display control lines, a drain electrode connected with one of the touch driving sub-electrodes, and a source electrode connected with the common electrode signal line.

7. The in-cell touch panel of claim 6, wherein, the first switching transistor and the second switching transistor are both N-type transistors or P-type transistors and the display control line and the touch control line corresponding to a same row of sub-electrodes are configured to apply control signals with opposite polarities at the same time; or the first switching transistor and the second switching transistor are an N-type transistor and a P-type transistor respectively and the display control line and the touch control line corresponding to a same row of sub-electrodes are configured to apply control signals with a same polarity at the same time.

8. The in-cell touch panel of claim 1, wherein, the turning-on switching device is a third switching transistor with a gate electrode and a source electrode connected with a corresponding gate line, and a drain electrode connected with the display control line; and the turning-off switching device is a fourth switching transistor with a gate electrode connected with the touch control line, a source electrode connected with a corresponding gate line, and a drain electrode connected with the display control line.

9. The in-cell touch panel of claim 1, wherein the plurality of sub-electrodes arranged in an array is resulted from a partitioning of the common electrode layer, and the touch driving sub-electrodes and the common sub-electrodes are arranged alternatively in both row and column directions of a matrix.

10. The in-cell touch panel of claim 1, wherein the plurality of sub-electrodes arranged in an array is resulted from a partitioning of the common electrode layer, and the touch driving sub-electrodes and the common sub-electrodes are arranged in corresponding rows of a matrix.

11. A display device, comprising the in-cell touch panel of claim 1.

12. The in-cell touch panel of claim 2, wherein the plurality of sub-electrodes arranged in an array is resulted from a partitioning of the common electrode layer, and the touch driving sub-electrodes and the common sub-electrodes are arranged alternatively in both row and column directions of a matrix.

13. The in-cell touch panel of claim 2, wherein the plurality of sub-electrodes arranged in an array is resulted from a partitioning of the common electrode layer, and the touch driving sub-electrodes and the common sub-electrodes are arranged in corresponding rows of a matrix.

14. The in-cell touch panel of claim 3, wherein the plurality of sub-electrodes arranged in an array is resulted from a partitioning of the common electrode layer, and the touch driving sub-electrodes and the common sub-electrodes are arranged alternatively in both row and column directions of a matrix.

15. The in-cell touch panel of claim 3, wherein the plurality of sub-electrodes arranged in an array is resulted from a partitioning of the common electrode layer, and the touch driving sub-electrodes and the common sub-electrodes are arranged in corresponding rows of a matrix.

16. The in-cell touch panel of claim 4, wherein the plurality of sub-electrodes arranged in an array is resulted from a partitioning of the common electrode layer, and the touch driving sub-electrodes and the common sub-electrodes are arranged alternatively in both row and column directions of a matrix.

17. The in-cell touch panel of claim 4, wherein the plurality of sub-electrodes arranged in an array is resulted from a partitioning of the common electrode layer, and the touch driving sub-electrodes and the common sub-electrodes are arranged in corresponding rows of a matrix.

* * * * *